United States Patent
Agarwala et al.

(10) Patent No.: US 9,800,484 B2
(45) Date of Patent: Oct. 24, 2017

(54) OPTIMIZING RESOURCE UTILIZATION IN A NETWORKED COMPUTING ENVIRONMENT

(71) Applicant: International Business Machines Corporation, Armonk, NY (US)

(72) Inventors: Sandip Agarwala, Cupertino, CA (US); Venkateswarlu Basyam, Hyderabad (IN); Kavita Chavda, Roswell, GA (US); Dean Hildebrand, San Jose, CA (US); Ramani R. Routray, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 578 days.

(21) Appl. No.: 14/202,237

(22) Filed: Mar. 10, 2014

(65) Prior Publication Data

US 2015/0256432 A1    Sep. 10, 2015

(51) Int. Cl.
| | |
|---|---|
| *G06F 15/167* | (2006.01) |
| *H04L 12/26* | (2006.01) |
| *G06F 9/50* | (2006.01) |
| *H04L 12/24* | (2006.01) |

(52) U.S. Cl.
CPC ........ *H04L 43/0876* (2013.01); *G06F 9/5077* (2013.01); *H04L 41/0806* (2013.01); *H04L 41/0823* (2013.01)

(58) Field of Classification Search
CPC .............. H04L 12/26; H04L 29/08072; H04L 67/1008; H04L 43/0876; H04L 41/082; H04L 67/1097; G06F 9/5072; G06F 9/45558

USPC ........................................ 709/214, 223, 200
See application file for complete search history.

(56) References Cited

U.S. PATENT DOCUMENTS

| | | | | |
|---|---|---|---|---|
| 7,281,013 | B2* | 10/2007 | Chaudhuri | G06F 17/30595 707/602 |
| 7,650,414 | B2* | 1/2010 | Karaoguz | H04N 7/163 348/207.1 |
| 7,689,538 | B2* | 3/2010 | Li | G06F 17/30457 707/999.002 |
| 7,783,844 | B2* | 8/2010 | Miki | G06F 11/2069 711/114 |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — El Hadji Sall
(74) *Attorney, Agent, or Firm* — William H. Hartwell; Hunter E. Webb; Keohane & D'Alessandro, PLLC

(57) ABSTRACT

An approach for managing and optimizing available resources utilized in a networked computing environment (e.g., a cloud computing environment) is provided. In one aspect, a plurality of resources in a plurality of storage pools within the networked computing environment are monitored. Each storage pool is running at least one application workload using a corresponding subset of the plurality of resources. The storage pools are ranked based on the application workloads. In response to an over-utilized storage pool and/or an under-utilized storage pool, the plurality of resources are dynamically reconfigured.

20 Claims, 11 Drawing Sheets

(56) References Cited

U.S. PATENT DOCUMENTS

| | | | | |
|---|---|---|---|---|
| 8,180,855 B2* | 5/2012 | Aiello | .................. | G06F 3/0607 709/219 |
| 8,281,090 B2* | 10/2012 | Schnapp | .............. | G06F 3/0605 711/162 |
| 2004/0254824 A1* | 12/2004 | Loucaides | .............. | G06Q 40/00 705/35 |
| 2005/0246401 A1* | 11/2005 | Edwards | ........... | G06F 17/30233 |
| 2011/0016214 A1* | 1/2011 | Jackson | ............... | G06F 9/5044 709/226 |
| 2011/0225451 A1* | 9/2011 | Leggette | ............ | G06F 12/1425 714/6.22 |
| 2011/0270968 A1* | 11/2011 | Salsburg | .............. | G06F 9/5072 709/224 |
| 2011/0320520 A1* | 12/2011 | Jain | ...................... | G06F 9/5072 709/203 |
| 2012/0246317 A1* | 9/2012 | Eriksson | .............. | G06F 9/5072 709/226 |
| 2012/0303776 A1* | 11/2012 | Ferris | ................... | G06F 9/5072 709/223 |
| 2012/0311564 A1* | 12/2012 | Khalid | .................... | G06F 8/61 718/1 |
| 2013/0097275 A1* | 4/2013 | Wofford, IV | ........ | G06F 3/0605 709/213 |
| 2013/0144990 A1* | 6/2013 | Gao | ..................... | G06F 9/5072 709/220 |

OTHER PUBLICATIONS

Maitland, J., "Keeping Control Isn't Easy", Chapter 4: Cloud-Based Infrastructure, SearchCloudComputing.com, 13 pages.

Mell, P. et al., "The NIST Definition of Cloud Computing", National Institute of Standards and Technology, Information Technology Laboratory, Version 15, Oct. 7, 2009, 2 pages.

"Microsoft Private Cloud Fast Track Reference Architecture Guide", Published Jul. 2012, 73 pages, Author Unknown.

"VMware vCloud Architecting a vCloud", Version 1.6, Copyright 2010, 100 pages, Author Unknown.

* cited by examiner

OPTIMIZING RESOURCE UTILIZATION IN A NETWORKED COMPUTING ENVIRONMENT

TECHNICAL FIELD

In general, embodiments of the present invention relate to resources in a networked computing environment. Specifically, embodiments of the present invention relate to an approach for managing and optimizing resource utilization in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

The new generation of cloud and enterprise applications often requires a level of storage capacity and performance that is typically observed only in scientific and high performance computing workloads. In order to meet the demand of these new applications, there has been a gradual shift from a single client-server distributed file system architecture to a parallel file system architecture. A parallel file system architecture provides increased bandwidth via multiple parallel input/output (I/O) streams. In a storage cloud service, the underlying storage, computation, and network resources are managed by the underlying file systems and are shared across many different workloads that may belong to different tenants/customers. Each of these workloads may have different resiliencies, performance, and availability requirements.

Cluster file systems control performance via storage pools, which are logical groupings of network storage resources (e.g., disks). By changing the number and type of disks, it is possible to control the performance of the workload placed in each storage pool. However, the configuration and composition of the storage pools are usually statically defined and manually changed by system administrators.

SUMMARY

In general, an approach for managing and optimizing available resources utilized in a networked computing environment (e.g., a cloud computing environment) is provided. In an embodiment, a plurality of resources in a plurality of storage pools within the networked computing environment are monitored. Each storage pool is running at least one application workload using a corresponding subset of the plurality of resources. The storage pools are ranked based on the application workloads. In response to an event, such as an over-utilized storage pool, the plurality of resources are dynamically reconfigured. For example, a spare resource can be added to the over-utilized storage pool, or an unused resource from an under-utilized storage pool can be moved to the over-utilized storage pool. Two or more over-utilized storage pools with complementary workloads can be combined. Furthermore, an over-utilized storage pool can be split based on a priority of workloads running on the over-utilized storage pool.

A first aspect of the present invention provides a method for managing available resources in a networked computing environment, the method comprising the computer-implemented processes of: monitoring a resource utilization of a plurality of storage pools within the networked computing environment, wherein each storage pool is running at least one application workload using a plurality of resources; ranking the storage pools based on the at least one application workload running on the storage pool; and dynamically reconfiguring, in response to at least one of: an over-utilized storage pool or an under-utilized storage pool, the plurality of resources within the plurality of storage pools.

A second aspect of the present invention provides a system for managing available resources in a networked computing environment, comprising: a memory medium comprising instructions; a bus coupled to the memory medium; and a processor coupled to the bus that when executing the instructions causes the system to perform the computer-implemented processes of: monitoring a resource utilization of a plurality of storage pools within the networked computing environment, wherein each storage pool is running at least one application workload using a plurality of resources; ranking the storage pools based on the at least one application workload running on the storage pool; and dynamically reconfiguring, in response to at least one of: an over-utilized storage pool or an under-utilized storage pool, the plurality of resources within the plurality of storage pools.

A third aspect of the present invention provides a computer program product for managing available resources in a cloud computing environment, the computer program product comprising a computer readable storage media, and program instructions stored on the computer readable storage media, that cause at least one computer device to perform the computer-implemented processes of: monitoring a resource utilization of a plurality of storage pools within the networked computing environment, wherein each storage pool is running at least one application workload using a plurality of resources; ranking the storage pools based on the at least one application workload running on the storage pool; and dynamically reconfiguring, in response to at least one of: an over-utilized storage pool or an under-utilized storage pool, the plurality of resources within the plurality of storage pools.

A fourth aspect of the present invention provides a method for deploying a system for managing available resources in a networked computing environment, comprising: providing a computer infrastructure having at least one computer device that operates to perform the computer-implemented processes of: monitoring a resource utilization of a plurality of storage pools within the networked computing environment, wherein each storage pool is running at least one application workload using a plurality of resources; ranking the storage pools based on the at least one application workload running on the storage pool; and dynamically reconfiguring, in response to at least one of: an over-utilized storage pool or an under-utilized storage pool, the plurality of resources with the plurality of storage pools.

BRIEF DESCRIPTION OF THE DRAWINGS

These and other features of this invention will be more readily understood from the following detailed description of the various aspects of the invention taken in conjunction with the accompanying drawings in which.

Figure 1:
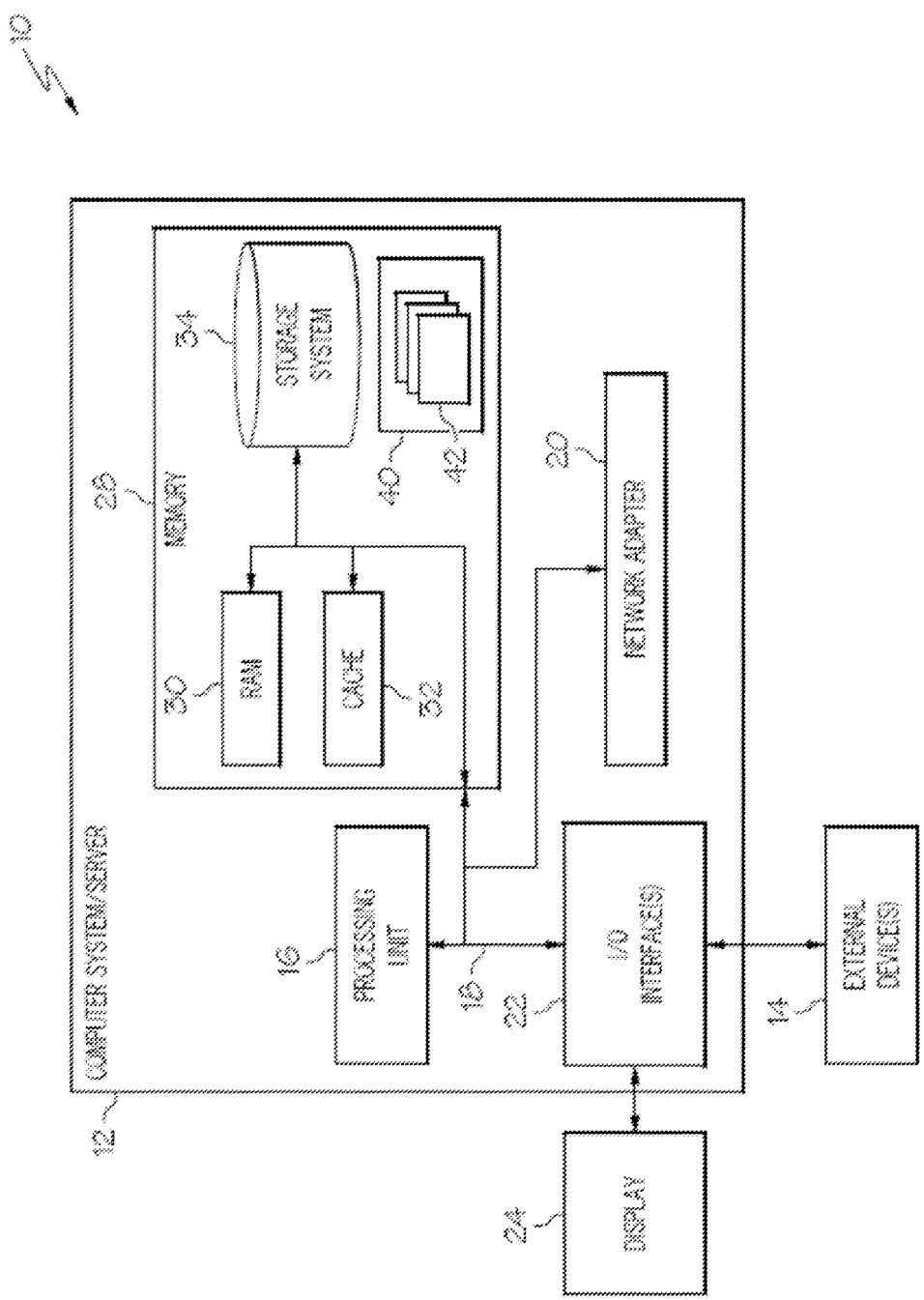
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments are described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for managing and optimizing available resources utilized in a networked computing environment (e.g., a cloud computing environment). In an embodiment, a plurality of resources in a plurality of storage pools within the networked computing environment are monitored. Each storage pool is running at least one application workload using a corresponding subset of the plurality of resources. The storage pools are ranked based on the application workloads. In response to an event, such as an over-utilized storage pool, the plurality of resources are dynamically reconfigured. For example, a spare resource can be added to the over-utilized storage pool, or an unused resource from an under-utilized storage pool can be moved to the over-utilized storage pool. Two or more over-utilized storage pools with complementary workloads can be combined. Furthermore, an over-utilized storage pool can be split based on a priority of workloads running on the over-utilized storage pool.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
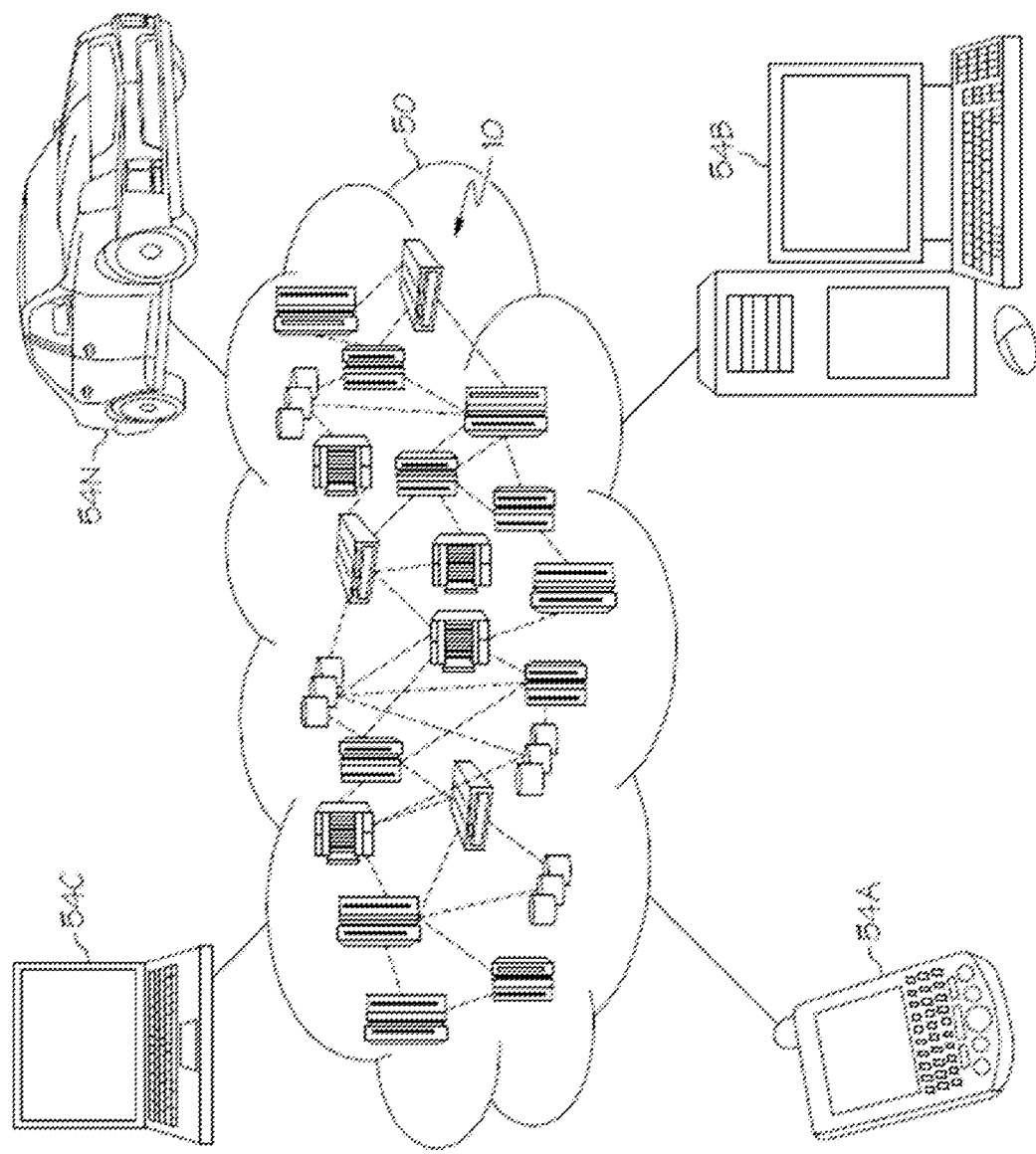
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
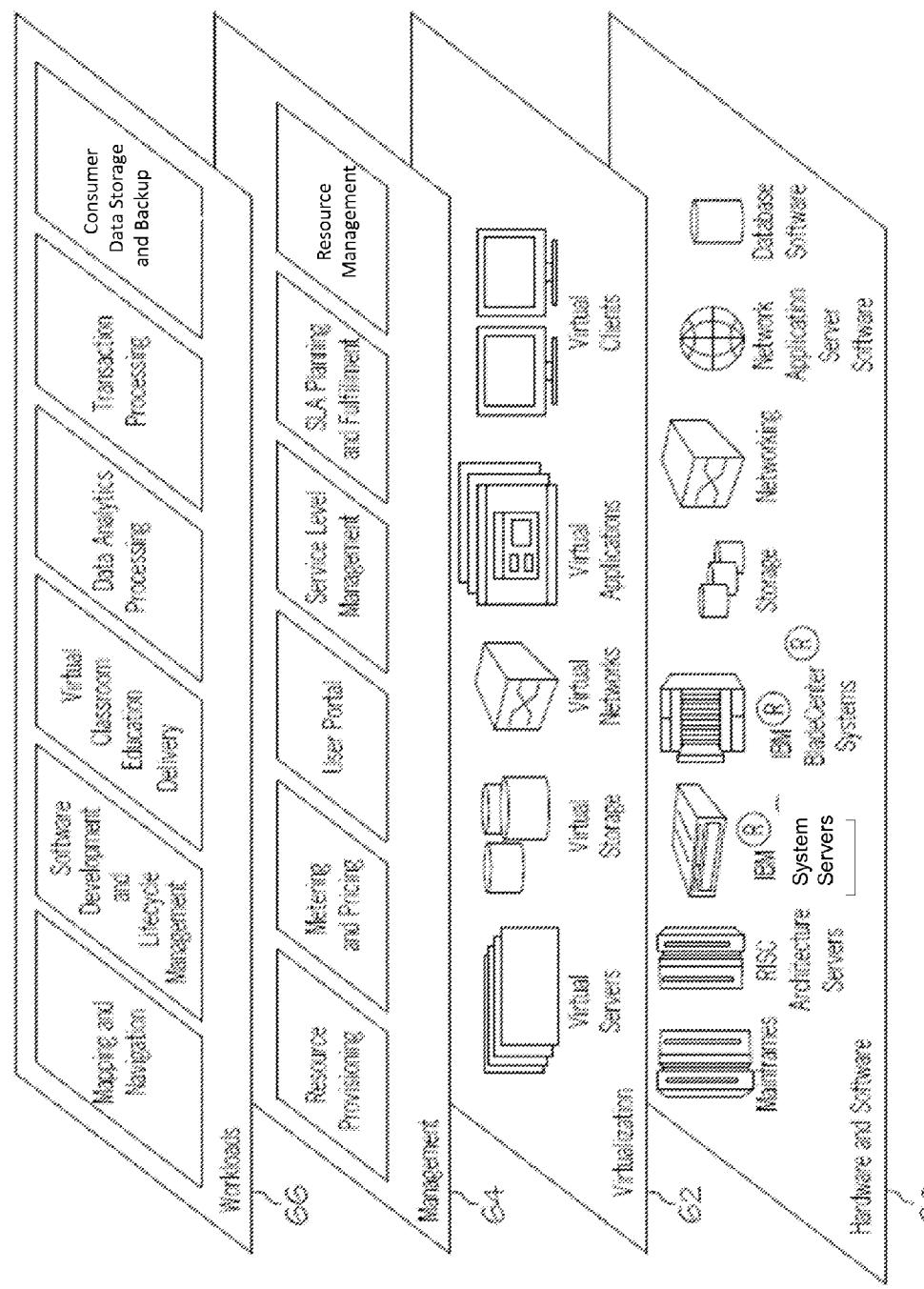
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is resource management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the resource management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
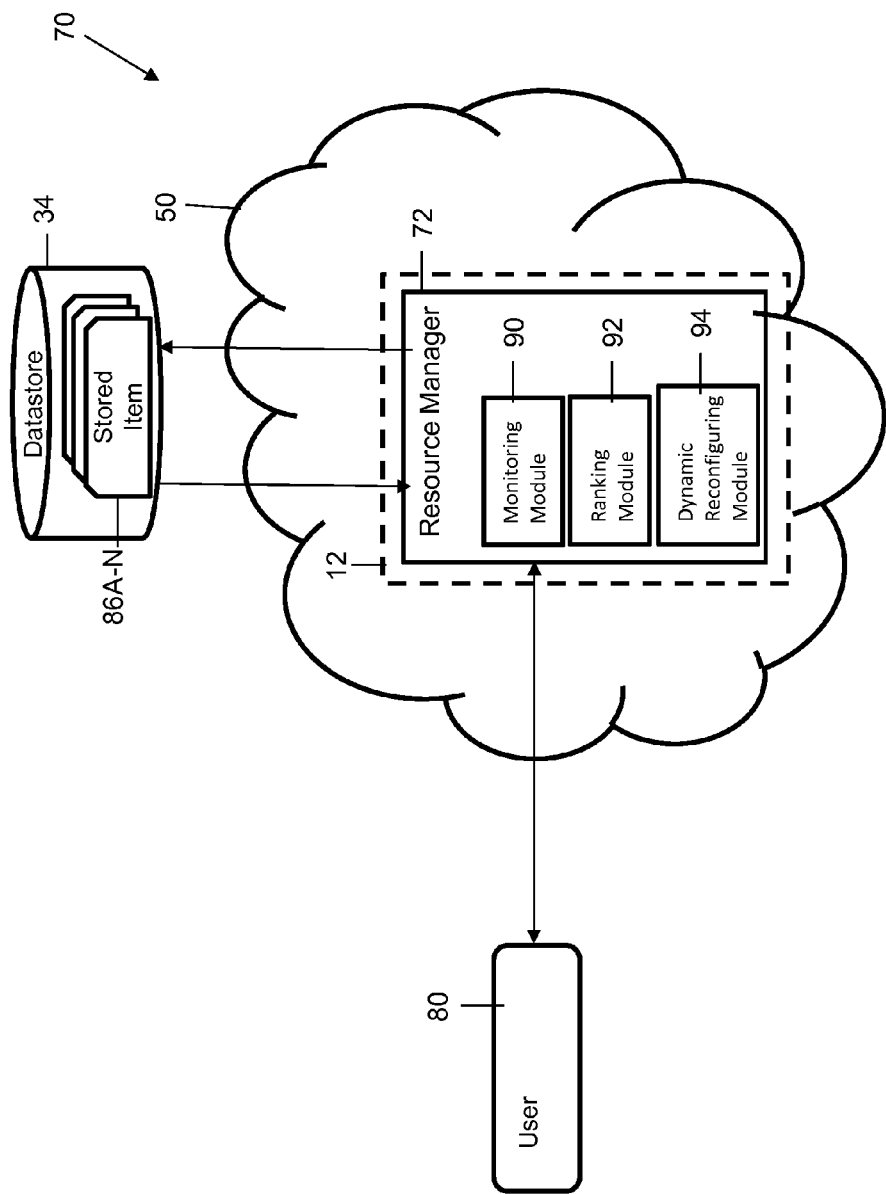
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have a resource manager (hereinafter "system 72"). Rather, system 72 could be loaded on a server or server-capable device that communicates (e.g., wirelessly) with the clients to provide management of resources therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for clarity.

Along these lines, system 72 may perform multiple functions similar to a general-purpose computer. Specifically, among other functions, system 72 can manage resources in networked computing environment 70. To accomplish this, system 72 can include: a monitoring module 90, a ranking module 92, and a dynamic reconfiguring module 94.

The system 72 can be configured to manage a plurality of resources within a networked computing environment 70. The networked computing environment 70 can be any type of computing environment that includes a file system that has a logical grouping of resources within each of a plurality of storage pools, such as International Business Machines Corp.'s General Parallel File System (GPFS™) and/or the like.

Figure 5:
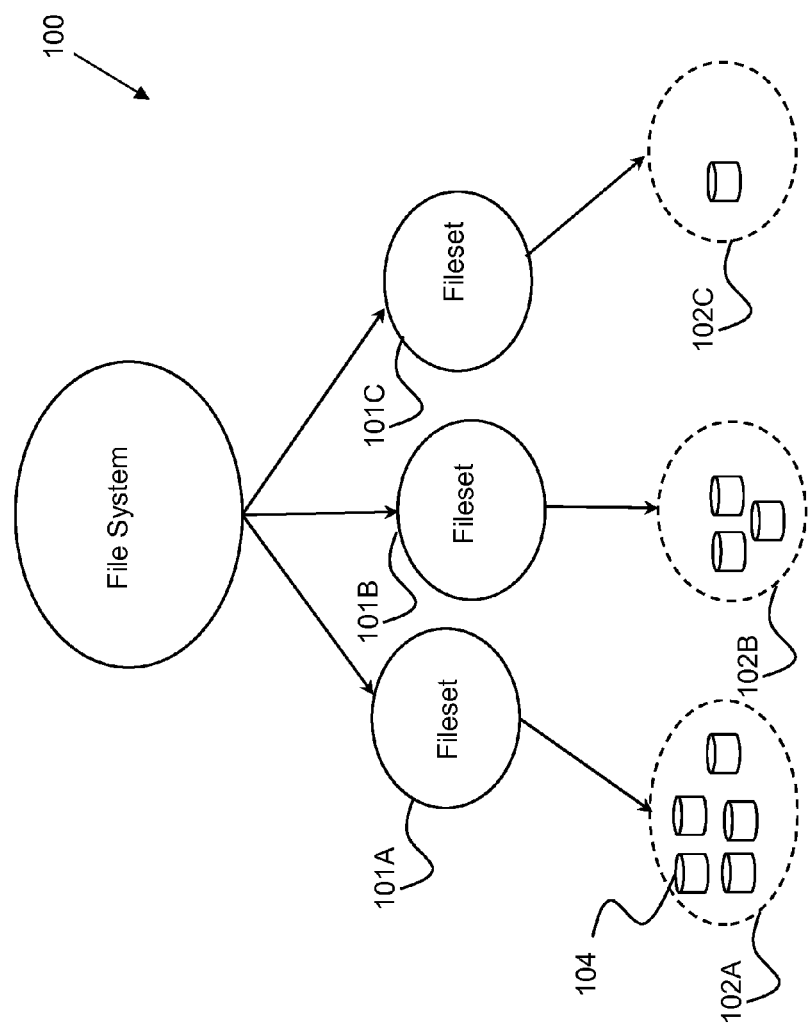
FIG. 5 depicts an example of a file system according to an embodiment of the present invention.

Turning now to FIG. 5, a block diagram of an illustrative file system 100 is shown. The file system 100 includes a plurality of filesets 101A, 101B, 101C and a plurality of storage pools 102A, 102B, 102C. As known in the art, filesets 101 map to workloads. Although, as illustrated, only one fileset is shown for each storage pool, it is understood that a fileset can be run across multiple storage pools. Furthermore, although only three storage pools are shown, it is understood that the file system 100 can include any number of storage pools and filesets. In any case, each storage pool 102A, 102B, 102C includes at least one resource 104 for running at least one application workload on the particular storage pool 102A, 102B, 102C. Additionally, while not shown, it is understood that the file system 100 can include one or more resources that are not currently being utilized in any storage pool 102A, 102B, 102C.

Referring to FIGS. 4 and 5, monitoring module 90 of system 72, as executed by computer system/server 12 (FIG. 1) is configured to monitor a resource utilization of each of the storage pools 102A, 102B, 102C. That is, monitoring module 90 monitors the storage capacity of each of the storage pools 102A, 102B, 102C, the performance capacity of each of the storage pools 102A, 102B, 102C, and/or the like. The storage capacity of each of the storage pools 102A, 102B, 102C is dependent on the size of each resource 104 as well as a utilization of the total storage capacity of each resource 104. In one example, which corresponds to a GPFS best practice, each resource 104 has a storage capacity equal in size. However, it is understood that each resource 104 can have a storage capacity of any size. The performance capacity of each storage pool 102A, 102B, 102C is a function of several factors, such as, disk performance characteristics, load and capacity of servers, interconnection fabrics, device adapter, and/or the like. Based on the storage capacity and the performance capacity of each storage pool 102A, 102B, 102C, monitoring module 90 of system 72 can determine if a storage pool is over or under-utilized. Monitoring module 90 can continue to monitor the utilization of each storage pool 102A, 102B, 102C for changes, e.g., due to an addition/removal of an application workload to/from a storage pool 102A, 102B, 102C, a change in a level of an existing workload (e.g., an increased/decreased input/output operations per second), and/or the like. In one embodiment, the maximum capacity of the storage pool is determined with respect to one or more workload requirement metrics. For example, workload requirement metrics can include the Input/Output Operations per Second (IOPs), the read and write bandwidth, the storage capacity, and/or the like. In one example, more than 80% of the maximum capacity can be used to determine over utilization and less than 20% of the maximum capacity can be used to determine under utilization.

Ranking module 92 of system 72, as executed by computer system/server 12 is configured to rank each of the storage pools 102A, 102B, 102C based on the priority of the application workloads running on the storage pool 102A, 102B, 102C. In one embodiment, the storage pools 102A, 102B, 102C can be ranked according to a priority set by a user 80 (FIG. 4) when a workload is launched.

Dynamic reconfiguring module 94 of system 72, as executed by computer system/server 12, is configured to dynamically reconfigure the resources 104, in response to an over-utilized and/or under-utilized storage pool 102A, 102B, 102C. Based on the results of ranking module 92, higher priority storage pools 102A, 102B, 102C are dynamically reconfigured first. Dynamic reconfiguring module 94 dynamically reconfigures the resources in each of the storage pools 102A, 102B, 102C to balance the loads between over-utilized storage pools and under-utilized storage pools.

Figure 7A:
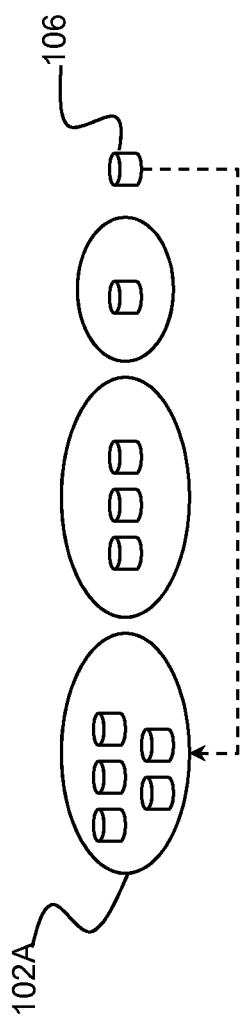
FIGS. 7A-7B depict an example of dynamically reconfiguring resources within the file system according to an embodiment of the present invention.
Figure 7B:
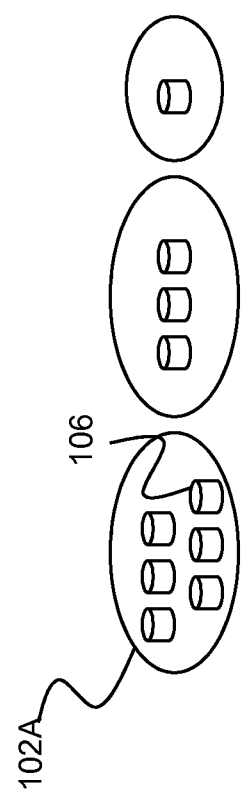

For example, turning to FIG. 7A, monitoring module 90 can determine that a storage pool 102A is over-utilized. Dynamic reconfiguring module 94 can add a spare resource 106 to the storage pool 102A, as seen in FIG. 7B. It is understood that a file system 100 can include any number of zero or more spare resources 106 at any given time.

Figure 8A:
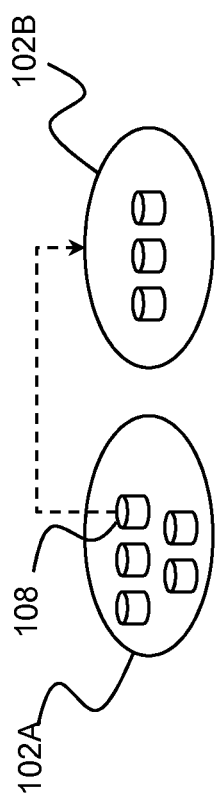
FIGS. 8A-8B depict an example of dynamically reconfiguring resources within the file system according to an embodiment of the present invention.
Figure 8B:
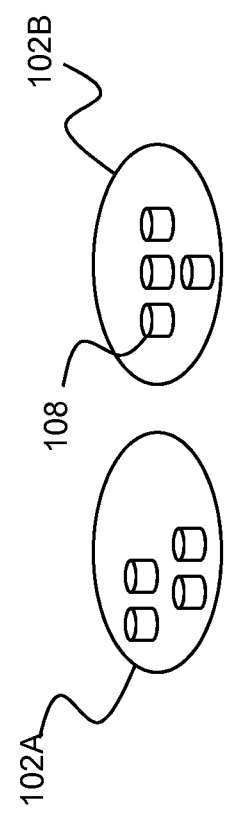

Turning now to FIG. 8A, in another embodiment, monitoring module 90 can determine that a first storage pool 102A is under-utilized, while a second storage pool 102B is over-utilized. In order to balance the load between each of these storage pools 102A, 102B, the dynamic reconfiguring module 94 can dynamically reconfigure the resources by moving an unused or under-utilized resource 108 in the under-utilized first storage pool 102A to the over-utilized second storage pool 102B (FIG. 8B). Although only one unused or under-utilized resource 108 is shown, it is understood that dynamic reconfiguring module 94 can move any number of resources. When the monitoring module 90 determines multiple over-utilized pools, the dynamic reconfiguring module 94 can seek to address the needs of each over-utilized pool according to the priority of the corresponding workloads. Furthermore, when the monitoring module 90 identifies multiple under-utilized pools, the dynamic reconfiguring module 94 can move resources from the most under-utilized storage pool first. In one embodiment, in response to monitoring module 90 determining that a storage pools is under-utilized, dynamic reconfiguring module 94 can remove one or more resources from the under-utilized storage pool.

Figure 9A:
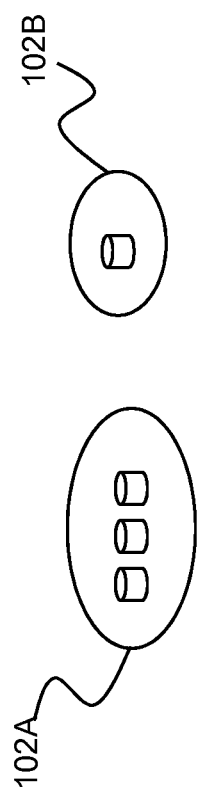
FIGS. 9A-9B depict an example of dynamically reconfiguring resources within the file system according to an embodiment of the present invention.
Figure 9B:
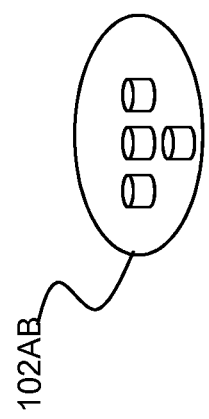

In another embodiment, the file system 100 (FIG. 5) can include a plurality of over-utilized storage pools. For example, in FIG. 9A, both storage pools 102A, 102B are over-utilized. However, the monitoring module 90 can determine that the first storage pool 102A and the second storage pool 102B have complementary workload characteristics. For example, each storage pool may utilize the resources at different times. Dynamic reconfiguring module 94 can dynamically reconfigure the resources by combining the first storage pool 102A and the second storage pool 102B into a single storage pool 102AB (FIG. 9B) with adequate resources for each application workload.

Figure 10A:
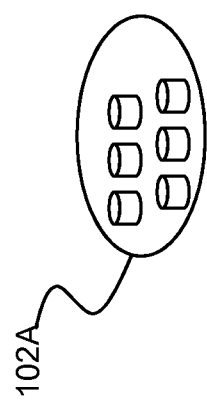
FIGS. 10A-10B depict an example of dynamically reconfiguring resources within the file system according to an embodiment of the present invention.
Figure 10B:
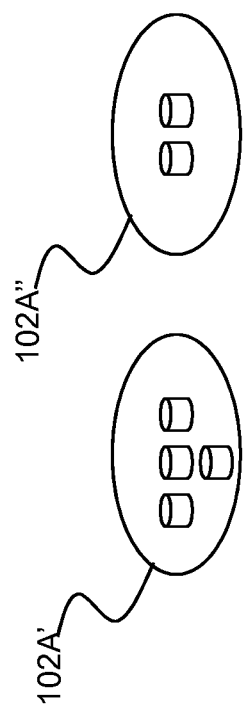

In a scenario where there are no spare resources 106 (FIG. 7A), no under-utilized storage pool 102A (FIG. 8A), and the over-utilized storage pool 102A cannot be combined with another over-utilized storage pool 102B (FIG. 9A), the ranking module 92 can rank each of the application workloads. For example, the over-utilized storage pool 102A in FIG. 10A can run a first application workload and a second application workload. Ranking module 92 can determine that the first application workload has a higher priority. Monitoring module 90 can determine the requirements of each application workload. Dynamic reconfiguring module 94 dynamically reconfigures the over-utilized storage pool 102A and splits the storage pool 102A into sub-storage pools 102A', 102A" (FIG. 10B). It is understood that storage pool 102A can be split into any number of two or more sub-storage pools. For example, the number of sub-storage pools can be dependent upon the number of application workloads. Alternatively, storage pool 102A can be split into a first sub-storage pool 102A' for the highest priority application workload and a second sub-storage pool 102A" for all the remaining application workloads. In this case, the sub-storage pool 102A' can be configured to have sufficient resources for the utilization demands, while sub-storage pool 102A" can remain over-utilized until additional resources can be allocated to the sub-storage pool 102A".

Figure 6:
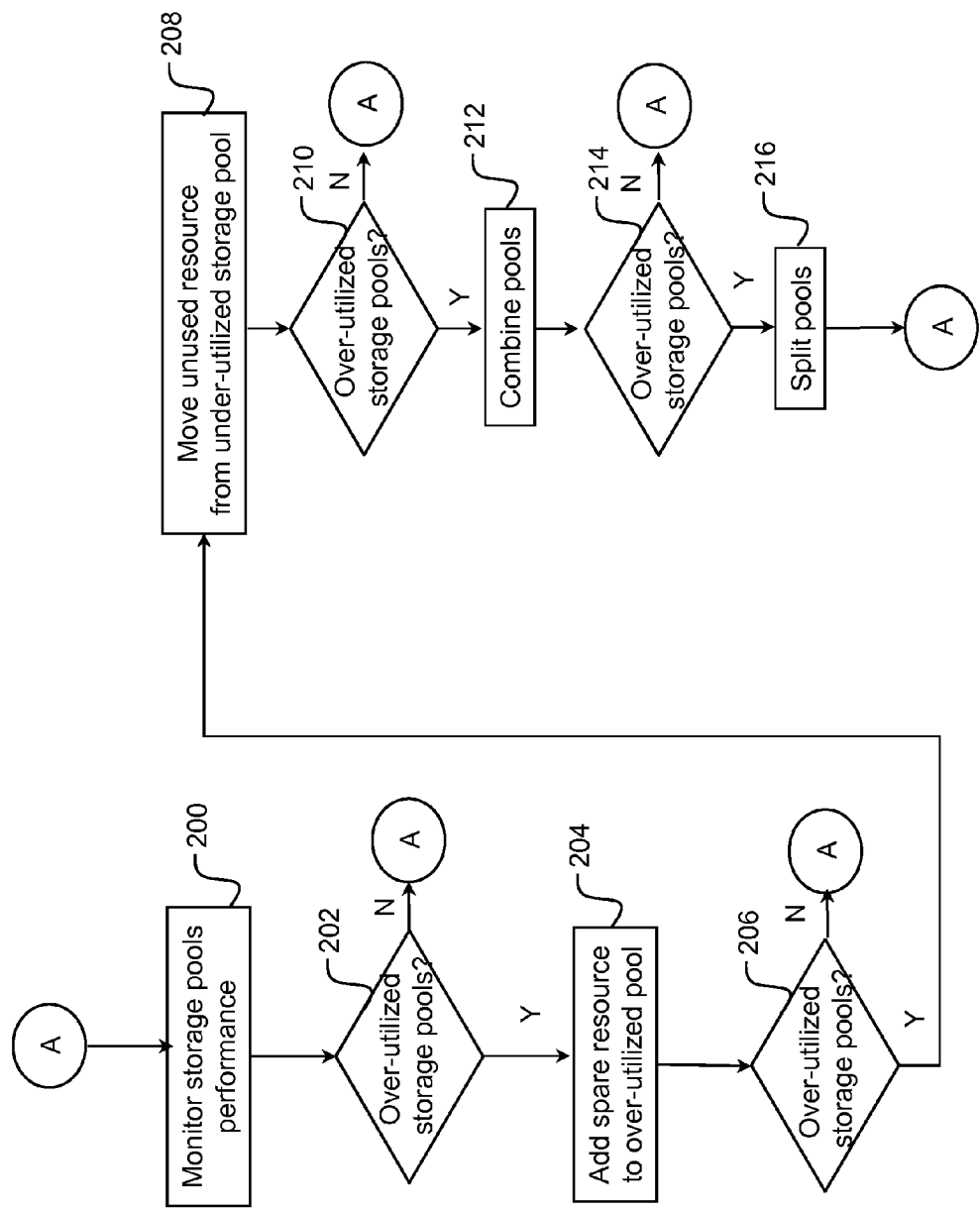
FIG. 6 depicts an example flow diagram according to an embodiment of the present invention.

An example of a flow diagram according to an embodiment of the present invention is shown in FIG. 6. Referring now to FIGS. 4-6, at function block 200, monitoring module 90 can monitor the plurality of storage pools 102A, 102B, 102C. At decision 202, monitoring module 90 can determine that at least one of the storage pools are over-utilized. Alternatively, the monitoring module 90 can also determine that at least one of the storage pools are under-utilized. If there are no over or under-utilized storage pools, then the system 72 will continue to monitor the plurality of storage pools 102A, 102B, 102C using monitoring module 90. However, if there is, for example, an over-utilized storage pool, at function block 204, the dynamic reconfiguring module 94 can add a spare resource to the over-utilized storage pool (FIGS. 7A-7B). If there is an under-utilized storage pool, the dynamic reconfiguring module 94 can remove one or more resources from the storage pool to make them spare resources. Alternatively, the dynamic reconfiguring module 94 can maintain the resources in the storage pool, e.g., to accommodate a possible future increase in the workload. If there are no spare resources, or after the spare resource is added to the over-utilized storage pool, the monitoring module 90 can continue to determine if there is an over-utilized or under-utilized storage pool at decision block 206. If so, the dynamic reconfiguring module 94 can move an unused resource from an under-utilized storage pool to an over-utilized storage pool at function block 208 (FIGS. 8A-8B). If there are no under-utilized storage pools, or after the unused resource is moved to the over-utilized storage pool, the monitoring module 90 continues to determine if there is an over-utilized and/or under-utilized storage pool at decision block 210. If so, the dynamic reconfiguring module 94 can, at function block 212 (FIGS. 9A-9B), combine two over-utilized storage pools with complementary workloads, combine an over-utilized storage pool with an under-utilized storage pool, combine an over-utilized storage pool with a storage pool having normal utilization, or the like. If there are no under-utilized or complementary storage pools, or after such storage pools have been combined with the over-utilized storage pool(s), the monitoring module 90 continues to determine if there is an over-utilized and/or under-utilized storage pool at decision block 214. If so, the dynamic reconfiguring module 94 can, at function block 216, split an over-utilized storage pool (FIGS. 10A-10B), combine under-utilized storage pools while freeing unused resources, and/or the like.

Figure 11:
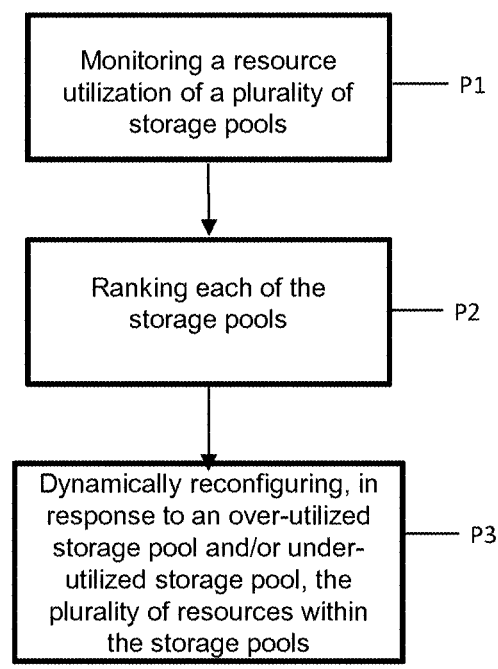
FIG. 11 depicts an example process flow according to an embodiment of the present invention.

Referring now to FIG. 11, a method flow according to an embodiment of the present invention is shown. At P1, monitoring module 90 of system 72, as executed by computer system/server 12 (FIG. 1), monitors a resource utilization of a plurality of storage pools. At P2, ranking module 92 of system 72, as executed by computer system/server 12, ranks each of the storage pools based on the application workload running on the storage pool. At P3, dynamic reconfiguring module 94, dynamically reconfigures, in response to an over-utilized storage pool and/or an under-utilized storage pool, the plurality of resources within the plurality of storage pools.

The flow of FIG. 11 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for managing available resources in a networked computing environment, it is understood that the invention further provides various alternative embodiments. For example, in one embodiment, the invention provides a computer-readable/useable medium that includes computer program code to enable a computer infrastructure to manage available resources, as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for managing available resources. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for managing available resources in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing available resources in a networked computing environment, the method comprising the computer-implemented processes of:

assigning each of a plurality of storage resources in the networked computing environment to one of a plurality of storage pools in a parallel file system architecture;

monitoring a resource utilization of the plurality of storage pools within the networked computing environment, wherein each storage pool is running at least one application workload using a plurality of resources;

ranking the storage pools based on the at least one application workload running on the storage pool; and dynamically reconfiguring, by at least one computer device in response to at least one of: an over-utilized storage pool or an under-utilized storage pool, the plurality of resources within the plurality of storage pools.

2. The method of claim 1, wherein the dynamically reconfiguring further comprises adding a spare resource to the over-utilized storage pool.

3. The method of claim 1, wherein the dynamically reconfiguring further comprises moving an unused resource from an under-utilized storage pool to the over-utilized storage pool.

4. The method of claim 1, wherein the dynamically reconfiguring further comprises combining the over-utilized storage pool with another over-utilized storage pool, wherein the over-utilized storage pools include complementary application workloads.

5. The method of claim 1, further comprising:

ranking each application workload on the over-utilized storage pool; and determining a number of resources required for each application workload.

6. The method of claim 5, wherein the dynamically reconfiguring further comprises splitting the over-utilized storage pool to separate resources corresponding to an application workload based on the ranking, resulting in a first storage subpool, which is not over-utilized, having resources corresponding to a highly ranked application and a second storage subpool, which is still over-utilized, having resources correspond to a less highly ranked application.

7. The method of claim 1, wherein the networked computing environment is a cloud computing environment and wherein the network resource is a cloud resource.

8. A system for managing available resources in a networked computing environment, comprising:

a memory medium comprising instructions;

a bus coupled to the memory medium; and a processor coupled to the bus that when executing the instructions causes the system to perform the computer-implemented processes of:

assigning each of a plurality of storage resources in the networked computing environment to one of a plurality of storage pools in a parallel file system architecture;

monitoring a resource utilization of the plurality of storage pools within the networked computing environment, wherein each storage pool is running at least one application workload using a plurality of resources;

ranking the storage pools based on the at least one application workload running on the storage pool; and dynamically reconfiguring, in response to at least one of: an over-utilized storage pool or an under-utilized storage pool, the plurality of resources within the plurality of storage pools.

9. The system of claim 8, wherein the dynamically reconfiguring further comprises adding a spare resource to the over-utilized storage pool.

10. The system of claim 8, wherein the dynamically reconfiguring further comprises moving an unused resource from an under-utilized storage pool to the over-utilized storage pool.

11. The system of claim 8, wherein the dynamically reconfiguring further comprises combining the over-utilized storage pool with another over-utilized storage pool, wherein the over-utilized storage pools include complementary application workloads.

12. The system of claim 8, further comprising:
    ranking each application workload on the over-utilized storage pool; and
    determining a number of resources required for each application workload.

13. The system of claim 12, wherein the dynamically reconfiguring further comprises splitting the over-utilized storage pool to separate resources corresponding to an application workload based on the ranking, resulting in a first storage subpool, which is not over-utilized, having resources corresponding to a highly ranked application and a second storage subpool, which is still over-utilized, having resources correspond to a less highly ranked application.

14. The system of claim 8, wherein the networked computing environment is a cloud computing environment and wherein the network resource is a cloud resource.

15. A computer program product for managing available resources in a cloud computing environment, the computer program product comprising a computer readable storage device, and program instructions stored on the computer readable storage media, that cause at least one computer device to perform the computer-implemented processes of:
    assigning each of a plurality of storage resources in the networked computing environment to one of a plurality of storage pools in a parallel file system architecture;
    monitoring a resource utilization of the plurality of storage pools within the networked computing environment, wherein each storage pool is running at least one application workload using a plurality of resources;
    ranking the storage pools based on the at least one application workload running on the storage pool; and
    dynamically reconfiguring, in response to at least one of: an over-utilized storage pool or an under-utilized storage pool, the plurality of resources within the plurality of storage pools.

16. The computer program product of claim 15, wherein the dynamically reconfiguring further comprises adding a spare resource to the over-utilized storage pool.

17. The computer program product of claim 15, wherein the dynamically reconfiguring further comprises moving an unused resource from an under-utilized storage pool to the over-utilized storage pool.

18. The computer program product of claim 15, wherein the dynamically reconfiguring further comprises combining the over-utilized storage pool with another over-utilized storage pool, wherein the over-utilized storage pools include complementary application workloads.

19. The computer program product of claim 15, further comprising:
    ranking each application workload on the over-utilized storage pool; and
    determining a number of resources required for each application workload.

20. The computer program product of claim 19, wherein the dynamically reconfiguring further comprises splitting the over-utilized storage pool to separate resources corresponding to an application workload based on the ranking, resulting in a first storage subpool, which is not over-utilized, having resources corresponding to a highly ranked application and a second storage subpool, which is still over-utilized, having resources correspond to a less highly ranked application.

\* \* \* \* \*